United States Patent [19]
Weh

[11] Patent Number: 5,633,551
[45] Date of Patent: May 27, 1997

[54] MACHINE WITH TRANSVERSE FLUX

[76] Inventor: Herbert Weh, Wöhlerstrasse 20, Braunschweig, Germany

[21] Appl. No.: 421,505

[22] Filed: Apr. 13, 1995

[30] Foreign Application Priority Data

Apr. 15, 1994 [DE] Germany ............ 44 13 219.0

[51] Int. Cl.⁶ ............ H02K 1/12; H02K 1/22; H02K 21/12
[52] U.S. Cl. ............ 310/266; 310/254; 310/261; 310/156
[58] Field of Search ............ 310/12, 13, 14, 310/154, 156, 254, 266

[56] References Cited

U.S. PATENT DOCUMENTS

| | | | |
|---|---|---|---|
| 3,585,423 | 6/1971 | Bolton et al. | 310/13 |
| 3,770,995 | 11/1973 | Eastham et al. | 310/13 |
| 4,255,680 | 3/1981 | Popov et al. | 310/13 |
| 5,010,262 | 4/1991 | Nakagawa et al. | 310/12 |
| 5,051,641 | 9/1991 | Weh | 310/163 |
| 5,117,142 | 5/1992 | Von Zweygbergk | 310/156 |
| 5,207,751 | 5/1993 | Suzuki et al. | 417/226.1 |
| 5,289,072 | 2/1994 | Lange | 310/266 |
| 5,396,140 | 3/1995 | Goldie et al. | 310/268 |

FOREIGN PATENT DOCUMENTS

| | | |
|---|---|---|
| 0173389 | 3/1986 | European Pat. Off. . |
| 3915623 | 5/1989 | Germany . |
| 3927453 | 8/1989 | Germany . |
| 4138014 | 11/1991 | Germany . |
| WO9314551 | 7/1993 | WIPO . |

*Primary Examiner*—Thomas M. Dougherty
*Assistant Examiner*—Michael Wallace, Jr.
*Attorney, Agent, or Firm*—Salter & Michaelson

[57] ABSTRACT

In order to achieve high potency for magnetic circuits together with a favourable possibility of constructing them in four-phase and two-phase form using radially positioned permanent magnets in flux concentration mode, it is proposed to introduce E-shaped stator pole elements with at least one fanned-out limb each. This gives the most favourable utilisation of the permanent magnets together with high functionality with a view to the maximum obtainable rotor diameter and favourable component manufacture. Both four-phase and two-phase machines may be constructed with the same pole elements. For exclusively two-phase windings there is a possibility of shortening the distance between the part-rotors.

15 Claims, 2 Drawing Sheets

MACHINE WITH TRANSVERSE FLUX

FIELD OF THE INVENTION

The invention relates to a transverse flux machine, comprising a stator and a rotor and magnetic circuits, the flux of which runs substantially across the direction of movement of the rotor, wherein the stator has pole elements of the same type, arranged at the same pitch in the housing of the machine. The pole elements have two spaced-apart outer pole limbs, which extend from a web joining the outer limbs and have one pole element located between those limbs. The stator has at least one two-phase annular winding, the phases of which are arranged between the outer limbs of the pole elements, lying against the web. The rotor is provided with at least two exciter members lying one above the other at a spacing across the direction of movement, with permanent magnets arranged at a spacing in the direction of movement and alternating in their flux direction in the direction of movement, and soft iron elements arranged between the permanent magnets at a pitch corresponding to that of the pole elements and with a width corresponding to that of the limbs of the pole elements.

Transverse flux machines of this type may be constructed with a rotor or alternatively as a linear drive with a flat stator and rotor.

DESCRIPTION OF THE PRIOR ART

Transverse flux machines of this type are known from German patent specification DE 41 38 014 C1. In this known machine E-shaped pole elements in flat form are provided, which are simple to manufacture. Such elements may be made, for example, from punched metal sheets in flat form, which are stuck on. However the pole elements may equally be made by pressing iron powder particles with appropriate bonding agents or in sintered form in flat moulds. The exciter members are annular and fixed to one or both sides of a rotor. In this known machine the magnets and soft iron elements are inclined to the direction of movement. Owing to the geometry this leads to unfavourable conditions for the magnetic flux and in particular to a greater space requirement in the direction of movement, given the same magnetic conductivity in the soft iron region. In addition space which is lost for magnetisation by the permanent magnets has to be allowed for in the region near the airgap. With the inclined arrangement of magnets and soft iron elements the rotor arrangement between the poles of the pole elements further requires a relatively great height. In rotating machines this leads to a shortening of the mean diameter effective for torque formation, assuming that there are fixed pre-determined outside dimensions.

SUMMARY OF THE INVENTION

The invention aims to improve the effectiveness of the exciter members and also to simplify manufacture.

For this purpose the invention provides that the pole elements located between the outer pole limbs of the elements are arranged offset from the outer limbs by one pole pitch and the permanent magnets are substantially cubic and lie with their flux direction perpendicular to the planes of the pole surfaces of the pole elements adjoining the exciter members.

The pole limbs with their pole surfaces opposite may be offset, in that the pole elements are E-shaped and at least one pole limb of the E-shaped pole elements in each case, alternately with the other pole limbs, is divided symmetrically across the direction of movement of the rotor and offset relative to the undivided pole limbs, in such a way that the external surfaces of the offset pole limbs of the pole elements are each in contact with the external surfaces of the offset pole limbs of the adjacent pole elements.

The central pole limb is preferably divided in an axial direction. If the central pole limb has substantially the same height perpendicular to the direction of movement of the rotor as the two outer pole limbs, a four-phase construction of the machine is possible.

In the case of a two-phase winding with the two windings inserted in the pole elements connected in parallel at one side, the central pole limb may have a radial height corresponding to approximately eight to twelve times the airgap. In this way, with a pre-determined outside diameter of a rotating machine, the machine diameter effective for torque formation increases correspondingly.

In the case of a two-phase winding the central pole element may be formed magnetically isolated from the other pole element and be arranged in a ring of non-magnetic material provided with fastening attachments which are located between the pole elements. Here again a radial height corresponding approximately to eight to twelve times the airgap is sufficient for the central pole element in a rotating machine.

Such isolation of the central pole element and arrangement in the ring of non-magnetic material at an axial spacing from the inside of the body of the pole elements facing towards the rotor enables one winding to be provided at each side, the winding extending over the height of the body between the outer pole limbs. Thus space is obtained for an enlarged winding cross-section and the leakage fraction of the winding is reduced, without thereby shortening the machine diameter effective for torque formation.

DESCRIPTION OF THE DRAWING

Some embodiments of the invention are illustrated in the accompanying drawings and described in detail below with reference to them. In the drawings.

DESCRIPTION OF PREFERRED EMBODIMENTS

Figure 1:
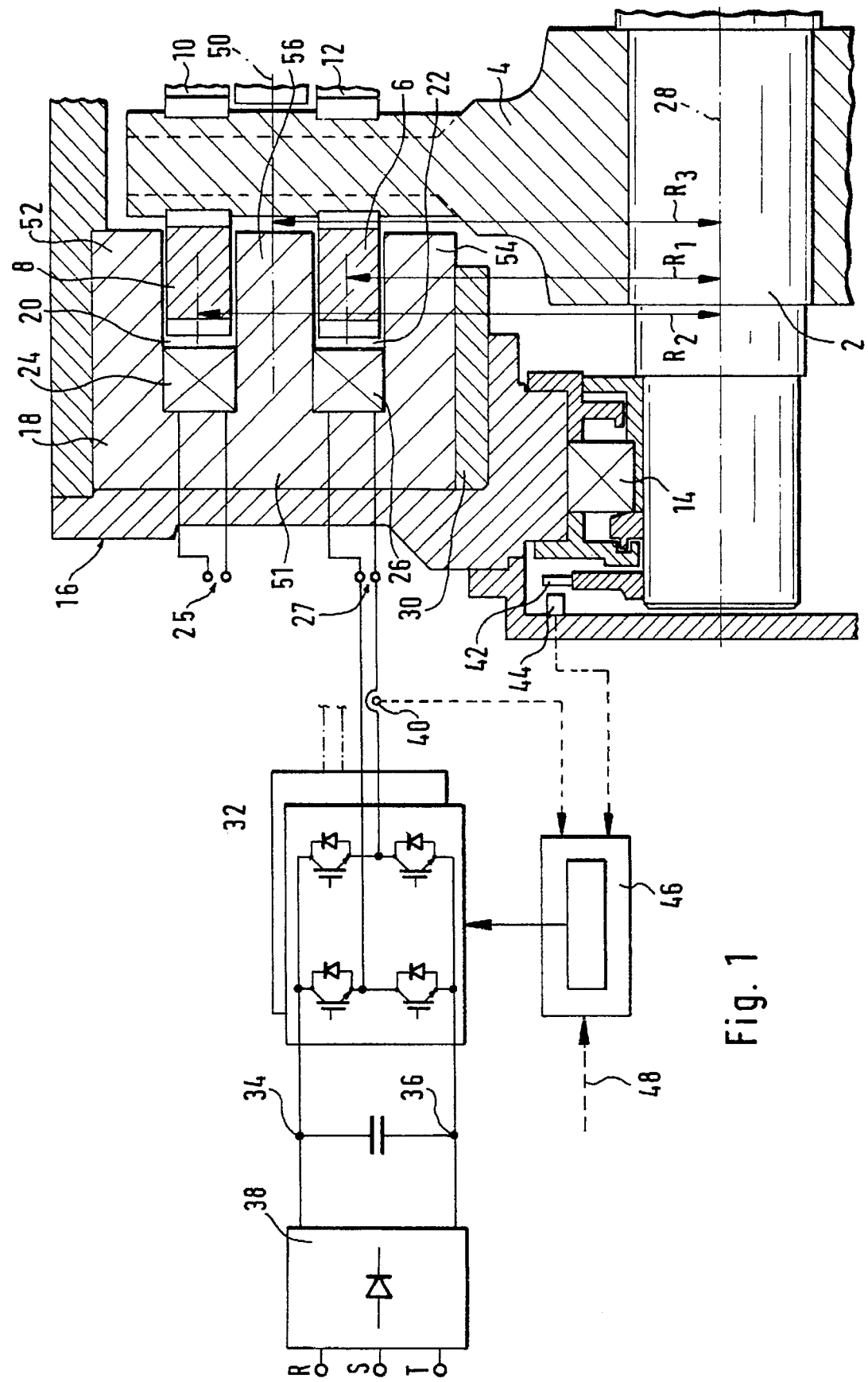
FIG. 1 shows a transverse flux machine, in the form of a motor with a rotor connected to the means for controlled power supply
Figure 3:
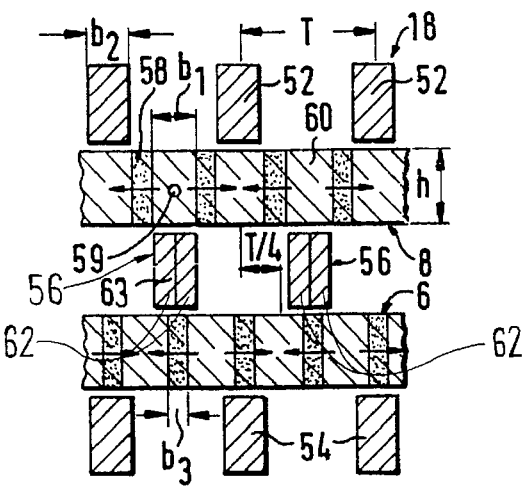
FIG. 3 is a section taken along the line B—B in FIG. 2
Figure 6:
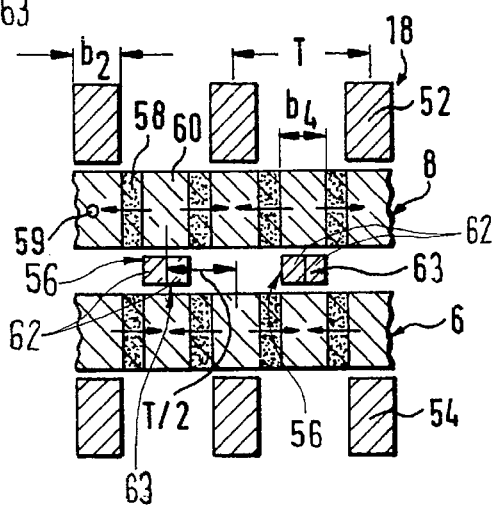
FIG. 6 is a section taken along the line C—C in FIG. 5

The rotating transverse flux machine illustrated in FIG. 1 carries a rotor 4 on a shaft 2, to which rotor annular exciter members with permanent magnets are attached with mean radii $R_1$, $R_2$ in flux concentration mode, the exciter members being fixed to the rotor radially and in a peripheral direction. The exciter members engage in depressions at the sides of the motor and are thus held positively in a radial direction. In an axial and a peripheral direction the moving parts are held by axial tie bolts 59 which, as indicated in FIGS. 3 and 6, are taken centrally through the soft iron elements of the exciter members and through the rotor. The shaft 2 is mounted rotatably in the housing 16 by bearings 14.

E-shaped pole elements 18 are arranged in the housing 16, with grooves 20, 22 between limbs 52, 54, and 56, on the bottom of each of which an annular winding 24, 26 is arranged coaxially with the axis 28 of the shaft 2. The windings have terminals 25 and 27 respectively, externally on the housing. The pole elements 18 are inserted in a fastening ring 30 fixed in the housing 16.

The windings 24 and 26 and the windings on the opposite side of the rotor, which are not shown here, are supplied with power by a controlled inverter 32 which has a d.c. voltage input 34, 36. An inverter is provided for every winding phase of the machine. The d.c. voltage is preferably produced in a rectifier 38, which may be connected to a three-phase system by its inputs R,S,T.

A current transformer 40 for measuring the current flowing in the connected winding is inserted in one of the supply conductors leading to the windings. A rotary position sensor, comprising a primary element 42 fixed on the shaft and a sensor element 44 on the housing, is further arranged on the motor itself.

The inverter 32 is controlled by a unit 46, to which the measured current and the rotor position are fed as actual values. The desired operating parameters are input in the control unit as control commands, as indicated by the arrow 48.

The machine diameter effective for torque formation can be obtained from the mean radii $R_1$ and $R_2$ of the two exciter members 6 and 8. It may, for example, lie on the mean diameter $R_3$.

The part-windings are fed with alternating currents 90° out of phase. The exciter members 6, 8, 10, 12 are correspondingly offset by half the distance between pole centres, corresponding to 90° in a peripheral direction.

Figure 2:
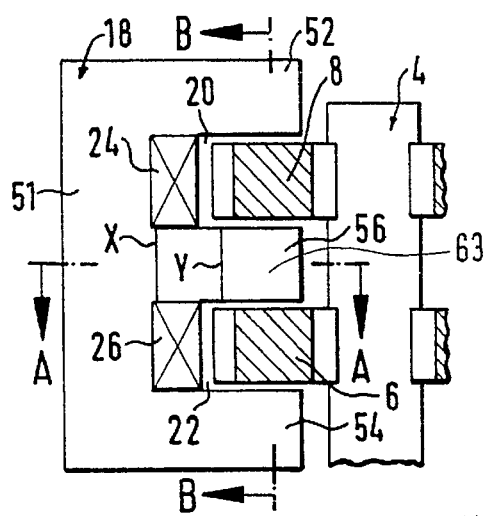
FIG. 2 shows a pole element with a winding and the exciter members in a first embodiment

The pole elements 18 in FIG. 2 correspond to the pole elements 18 shown in FIG. 1. They have a body 51, outer limbs 52,54 and a central limb 56. All three limbs have substantially the same height. As shown in FIG. 3, the central limb 56 of the pole elements 18 is offset from the outer limbs 52,54 by half the pitch T/2 of the pole elements. The exciter members 6 and 8, which are constructed in flux concentration mode in known manner, have permanent magnets 58 arranged with their flux directions perpendicular to the direction of movement, the flux directions of the magnets alternating as indicated by the arrows. Soft iron elements 60 directing the flux are arranged between the magnets and tied to the rotor by the bolts 59. One of the tie bolts 59 is shown in FIG. 3. The pole elements 18 and exciter members are represented as being flat, for clarity, in FIG. 3 and also FIG. 6. Moreover this arrangement corresponds to the arrangement used with a linear drive.

As shown in FIG. 3 the two exciter members 6 and 8 are offset from each other by half a pitch T/2, as will be further described later. The radial arrangement of the magnets enables the exciter members to have a smaller height h than in the known construction with inclined magnets and matching soft iron parts. The magnets 58 are substantially cubic. The width $b_1$ of the soft iron elements 60 in the direction of movement substantially corresponds to the width $b_2$ of the limbs 52, 54, 56 of the pole elements 18. The pitch T is obtained from the width of the soft iron elements plus the width $b_3$ of two permanent magnets 58.

Figure 4:
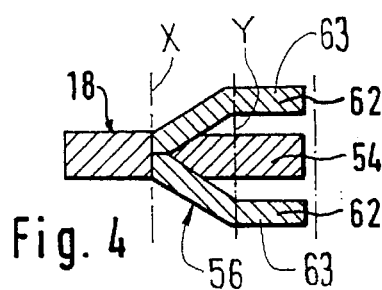
FIG. 4 is a section taken along the line A—A in FIG. 2

The offset of the central limbs 56 of the pole elements 18 can be obtained, as illustrated in FIG. 4, by dividing the central limb symmetrically and offsetting its two halves in opposite directions, in such a way that the sections 62 of the central limb of adjacent pole elements located between the exciter members have their external surfaces 63 touching each other, so that pairs of part-limbs of adjacent pole elements in each case form the central pole limb 56. The contact surfaces 63 can be seen from FIGS. 3 and 4.

In the embodiment illustrated the two oppositely directed offsetting lines X,Y of each limb member 62 are in the region of the exciter member line 4 and at the transition to the body 51 (line x). However the latter offset may be located partially in the body itself. Instead of the central limb the outer limbs 52, 54 may be offset as described and staggered half a pitch from the web.

To produce the pole elements with at least one limb fanned out by offsetting, flat-punched metal sheets may be offset by a further punching. The offset sheets are then stuck.

Through the offsetting of the two exciter members 6 and 8 by half a pitch the two windings 24 and 26 may be connected in parallel in a two-phase embodiment, as can the two opposing windings (not shown), which are then correspondingly supplied by the inverter offset by 90°. In this circuit the machine is operated as a two-phase machine.

Figure 5:
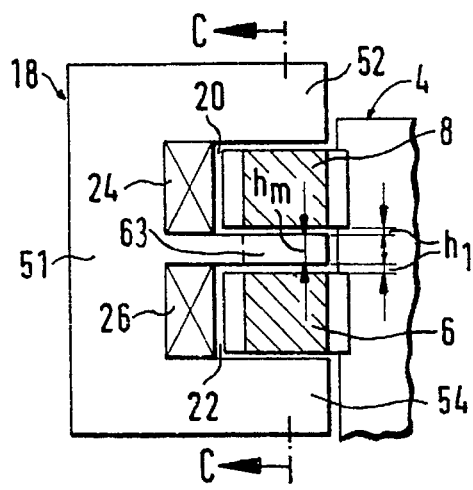
FIG. 5 shows a further embodiment of a pole element

With two-phase operation of the machine with the windings 24, 26 supplied in phase and the exciter members offset by one pitch, the height $h_m$ of the central limb 54 may be reduced, as shown in FIGS. 5 and 6, as far as the power-forming function by interaction with the permanent magnets allows it. Such reduction is possible because, with two-phase operation and offsetting of the exciter members by one pitch, the central limb 54 virtually has the magnetic field passing through it only in a radial direction. The minimum height is determined by the fact that "field penetration" between the exciter members 6 and 8 must largely be avoided. This can be achieved by selecting the minimum height $h_m$ as eight to twelve times the height h of the airgap.

Particularly in machines with a small and moderate diameter, the smaller height of the central limb provides an opportunity to increase the radius $R_3$ and thus the effective machine diameter for a given outside diameter of the housing, and thus the torque.

Figure 7:
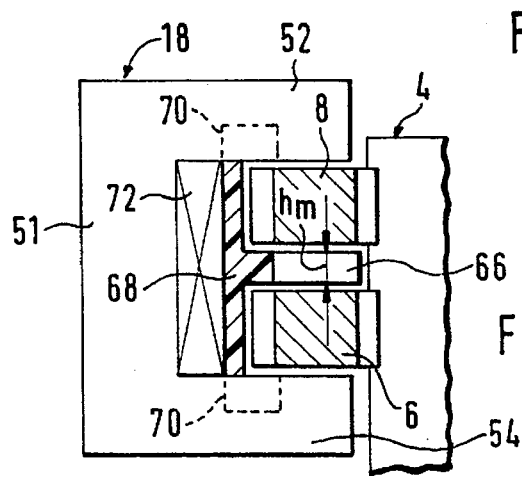
FIG. 7 shows a further embodiment, represented as in FIG. 2.

In a two-phase construction with annular windings 24, 26 supplied in phase, a magnetically conducting connection between the pole element formed by the central limb and the other pole elements may also be dispensed with. A corresponding construction is illustrated in FIG. 7. Here the central pole element 66 is magnetically isolated from the C-shaped pole element 18. The magnetically conductive pole elements 66 are held in a ring 68 of magnetically non-conductive material provided with fastening attachments 70, which extend between the outer limbs and are each joined to the external surfaces thereof or which may alternatively be attached to the fastening elements 30 for the pole elements 18.

A construction according to FIG. 7 gives an undivided groove space 72 extending over the entire height of the body between the inner and outer pole limb. This continuous space may be used to accommodate an enlarged winding cross-section and reduce its leakage fraction. The groove space may also be made shallower in a radial direction, whereby the mean rotor diameter can again be enlarged.

I claim:

1. A transverse flux machine comprising a stator, a rotor and magnetic circuits wherein the flux of the magnetic circuits runs substantially across a direction of movement of the rotor, said stator including a plurality of E-shaped pole elements arranged in side-by-side adjacent relation, each of said pole elements having a body, two spaced outer pole limbs and a central pole limb located between the outer pole limbs, said limbs having a common predetermined width, one of said pole limbs, alternately with the other pole limbs, being divided symmetrically across the direction of movement of the rotor into opposing limb parts, each of said limb parts having an outer side surface, said limb parts being offset in opposite directions along the direction of movement of the rotor, said pole elements being arranged within said machine such that the outer side surfaces of the limb parts of adjacent pole elements touch each other and cooperate with each other to define a central pole limbs which is offset from the other pole limbs, said outer and central pole limbs cooperating to define two spaced grooves respectively positioned between the respective limbs, each of said grooves including an annular two-phase winding which lies against a bottom surface of the respective groove, said rotor having two spaced exciter members, said exciter members respectively being received within said grooves of said stator, said exciter members including permanent magnets arranged at a spacing in the direction of movement and alternating in their flux directions in the direction of movement of the rotor, said rotor further including soft iron elements arranged between the permanent magnets at a pitch corresponding to a pitch of the pole elements, said iron elements having a width corresponding to the width of the limbs of the pole elements, said permanent magnets being substantially cubic and lying with their flux direction substantially perpendicular to a plane extending through the pole surfaces of the pole elements adjoining the exciter members.

2. The transverse flux machine of claim 1 wherein the central pole limb is divided.

3. The transverse flux machine of claim 1 wherein the central pole limb has a height which is substantially similar to the heights of the outer pole limbs, said heights being measured perpendicular to the direction of movement of the rotor.

4. The transverse flux machine of claim 1, wherein the central pole limb has a height which is approximately 8 to 12 times the height of an air gap measured between the exciter elements of the rotor and the pole limbs, said height being measured perpendicular to the direction of movement of the rotor.

5. The transverse flux machine of claim 1, wherein said machine comprises a rotary motor.

6. The transverse flux machine of claim 1, wherein said machine comprises a linear drive motor with a flat stator and rotor.

7. A transverse flux machine comprising a stator, a rotor and magnetic circuits wherein the flux of the magnetic circuits runs substantially across a direction of movement of the rotor, said stator including a plurality of C-shaped pole elements arranged in side-by-side adjacent relation, each of said pole elements having a body and two spaced pole limbs which cooperate to define a groove therebetween, said pole limbs having a common predetermined width, said stator further including an annular two-phase winding which lies against a bottom surface of the groove, said rotor having two spaced exciter members, said exciter members being received within said groove of said stator, said exciter members including permanent magnets arranged at a spacing in the direction of movement and alternating in their flux directions in the direction of movement of the rotor, said rotor further including soft iron elements arranged between the permanent magnets at a pitch corresponding to a pitch of the pole elements, said iron elements having a width corresponding to the width of the limbs of the pole elements, said permanent magnets being substantially cubic and lying with their flux direction substantially perpendicular to a plane extending through the pole surfaces of the pole elements adjoining the exciter members, said stator further including a central pole element arranged within the groove, said central pole element including a plurality of radially inwardly extending pole limbs that extend inwardly between the two spaced exciter elements, said pole limbs being offset from said spaced limbs of said C-shaped pole element in the direction of movement of the rotor by half the pitch of the C-shaped pole elements, said central pole element being magnetically isolated from said C-shaped pole elements by a ring of non-magnetic material fastened within the groove.

8. The transverse flux machine of claim 7 wherein a single winding is provided within the groove extending across the entire space between the spaced pole limbs of the C-shaped pole element.

9. The transverse flux machine of claim 7 wherein said ring of non-magnetic material is positioned on top of the winding.

10. The transverse flux machine of claim 7 wherein said machine comprises a rotary motor with a rotor.

11. Electrical apparatus comprising a stator, a rotor and magnetic circuits having a magnetic flux wherein the flux of the magnetic circuits runs substantially across a direction of movement of the rotor, said stator including a plurality of pole elements arranged within the apparatus in side-by-side adjacent relation, each of said pole elements having a body, and a plurality of spaced radially inwardly extending pole limbs, one of said pole limbs being symmetrically divided across the direction of movement of the rotor into opposing limb parts, said limb parts being separated in the direction of movement of the rotor into a Y-shaped configuration, said pole elements being arranged within said machine such that outside surfaces of the limb parts of adjacent pole elements touch each other in abutting relation and cooperate with each other to define a pole limb which is offset in the direction of movement of the rotor from the other pole limbs, said plurality of pole limbs cooperating to define grooves between adjacent pole limbs, each of said grooves including an annular winding which lies against a bottom surface of the respective groove, said rotor having a plurality of spaced exciter members, said exciter members respectively being received within said grooves of said stator, said exciter members including permanent magnets arranged at a spacing in the direction of movement and alternating in their flux directions in the direction of movement of the rotor, said rotor further including soft iron elements arranged between the permanent magnets.

12. The apparatus of claim 11 wherein the pole elements are E-shaped and include a central pole limb and two outer pole limbs, said central pole limb being symmetrically divided.

13. The apparatus of claim 12 wherein the central pole limb has a height which is substantially similar to heights of the outer pole limbs, said heights being measured perpendicular to the direction of movement of the rotor.

14. The apparatus of claim 12, wherein the central pole limb has a height which is approximately 8 to 12 times the height of an air gap measured between an exciter element of the rotor and one of the pole limbs, said height being measured perpendicular to the direction of movement of the rotor.

15. Electrical apparatus comprising a stator, a rotor and magnetic circuits having a magnetic flux, wherein the flux of the magnetic circuits runs substantially across a direction of movement of the rotor, said stator including a plurality of C-shaped pole elements arranged in side-by-side adjacent relation, each of said pole elements having a body and two spaced pole limbs which cooperate to define a groove therebetween, said stator further including an annular winding which lies against a bottom surface of the groove, said rotor having a plurality of spaced exciter members, said exciter members being received within said groove of said stator, said exciter members including permanent magnets arranged at a spacing in the direction of movement and alternating in their flux directions in the direction of movement of the rotor, said rotor further including soft iron elements arranged between the permanent magnets, said stator further including a central pole element arranged within the groove, said central pole element including a plurality of radially inwardly extending pole limbs that extend between two adjacent exciter elements, said pole limbs being offset from said spaced limbs of said C-shaped pole element in the direction of movement of the rotor by half the pitch of the C-shaped pole elements, said central pole element being magnetically isolated from said C-shaped pole elements by a ring of non-magnetic material fastened within the groove.

* * * * *